(12) United States Patent
Campos et al.

(10) Patent No.: US 11,429,336 B2
(45) Date of Patent: Aug. 30, 2022

(54) COMPUTING DEVICES WITH DISPLAY MODE CONTROL UNITS

(71) Applicant: Hewlett-Packard Development Company, L.P., Spring, TX (US)

(72) Inventors: Mario E. Campos, Spring, TX (US); Hsing-Hung Hsieh, Taipei (TW); Cheng-Hua Yu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/442,884

(22) PCT Filed: Jul. 23, 2019

(86) PCT No.: PCT/US2019/043047
§ 371 (c)(1),
(2) Date: Sep. 24, 2021

(87) PCT Pub. No.: WO2021/015743
PCT Pub. Date: Jan. 28, 2021

(65) Prior Publication Data
US 2022/0156027 A1    May 19, 2022

(51) Int. Cl.
*G06F 3/14* (2006.01)
*G06F 9/54* (2006.01)
*G06F 1/16* (2006.01)
*G09G 5/00* (2006.01)

(52) U.S. Cl.
CPC .......... *G06F 3/1438* (2013.01); *G06F 1/1647* (2013.01); *G06F 9/543* (2013.01); *G09G 5/003* (2013.01)

(58) Field of Classification Search
CPC .... G09G 2360/04; G09G 5/003; G06F 3/041; G06F 1/1647; G06F 9/543; G06F 3/1438
See application file for complete search history.

(56) References Cited

U.S. PATENT DOCUMENTS

| | | | |
|---|---|---|---|
| 10,142,581 B2 | 11/2018 | Lee | |
| 2010/0180055 A1 | 7/2010 | Lyon et al. | |
| 2013/0176248 A1 | 7/2013 | Shin et al. | |
| 2014/0075377 A1* | 3/2014 | Kang | G06F 3/04842 715/788 |
| 2014/0229518 A1* | 8/2014 | Wang | G06F 3/1454 709/201 |

FOREIGN PATENT DOCUMENTS

| | | |
|---|---|---|
| JP | 2015099237 A | 5/2015 |
| KR | 20140069661 A | 6/2014 |

* cited by examiner

*Primary Examiner* — Abbas I Abdulselam
(74) *Attorney, Agent, or Firm* — HP Inc. Patent Dept.

(57) ABSTRACT

A portable computing device may comprise an internal central processing unit (CPU), an internal graphics processing unit (GPU), a communications port to communicate with an external computing device, a first electronic display connected to the internal GPU, a second electronic display connected to the internal GPU, a touch input device to receive touch inputs from a user, and a display mode control unit. The control unit may cause the portable computing device to selectively operate in a dual display operational mode, a direct input operational mode, and an indirect input operational mode.

15 Claims, 5 Drawing Sheets

COMPUTING DEVICES WITH DISPLAY MODE CONTROL UNITS

BACKGROUND

A personal computer can be connected to multiple monitors or other external displays. A personal computer may, for example, duplicate a graphical user interface of a single operating system onto multiple monitors or expand the graphical user interface of the single operating system onto multiple monitors. The resolution, response time, and the number of monitors that may be connected to the personal computer may depend on the capabilities of the graphics processing unit of the personal computer.

BRIEF DESCRIPTION OF THE DRAWINGS

Non-limiting and non-exhaustive examples of the disclosure are described, including various examples of the disclosure, with reference to the figures, in which.

DETAILED DESCRIPTION

Figure 1A:
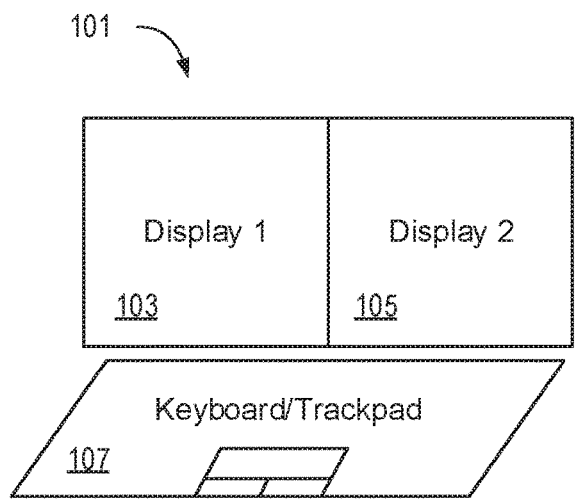
FIG. 1A illustrates an example personal computing device with two integrated displays and a keyboard/trackpad base.

According to many of the examples described herein, a portable computing device, such as a laptop computer, notebook computer, tablet device, or folding tablet device, may include multiple integrated electronic displays and/or be connected to multiple external electronic displays. In some examples, the portable computing device may include an integrated electronic display and be connected to an external electronic display to operate in a dual display configuration. In other examples, the portable computing device may include two integrated electronic displays and operate in a dual display configuration.

The portable computing device may include a display mode control unit in addition to a graphics processing unit (GPU) and central processing unit (CPU). The GPU may be, for example, an integrated GPU (iGPU) or a discrete GPU (dGPU) internal to the portable computing device. The display mode control unit may selectively operate the portable computing device in three distinct display operational modes. The display mode control unit may be in communication with the GPU of the portable computing device. The display mode control unit may also be connected to a communications port. The communications port may be a wired or wireless port to connect the portable computing device to an external computing device (e.g., a desktop computer, a server, another portable computing device, etc.)

The display mode control unit may operate the portable computing device in a first, dual display operational mode, in which dual displays are driven by the GPU and associated CPU of the portable electronic device. In a second, direct input operational mode, the display mode control unit may cause one of the electronic displays to display content from the portable computing device via the GPU and the other electronic display to display content from an external computing device connected via the communications port. The display mode control unit may cause the content from the external computing device to bypass or pass through the GPU of the portable computing device. Accordingly, the content displayed on the second electronic display from the external computing device may be rendered by an external GPU of the external computing device. In a third, indirect operational mode, the display mode control unit may operate the portable computing device as an input device for an external device connected to the display mode control unit via the communications port.

The examples of the disclosure may be further understood by reference to the drawings, wherein like parts are designated by like numerals throughout. It is readily understood that the components of the disclosed examples, as generally described and illustrated in the figures herein, could be arranged and designed in a wide variety of different configurations. Thus, the following detailed description of the examples of the systems and methods of the disclosure is not intended to limit the scope of the disclosure, as claimed, but is merely representative of possible examples of the disclosure.

In some cases, well-known features, structures, or operations are not shown or described in detail. Furthermore, the described features, structures, or operations may be combined in any suitable manner. It will also be readily understood that the components of the examples as generally described and illustrated in the figures herein could be arranged and designed in a wide variety of different configurations.

FIG. 1A illustrates an example personal computing device 101 with two integrated electronic displays 103 and 105, along with a keyboard/trackpad base 107. In various examples, the two electronic displays 103 and 105 may be connected to the keyboard/trackpad base 107 via a hinge or other pivoting component. In various examples, the electronic displays 103 and 105 are integrated as part of the portable computing device 101.

Figure 1B:
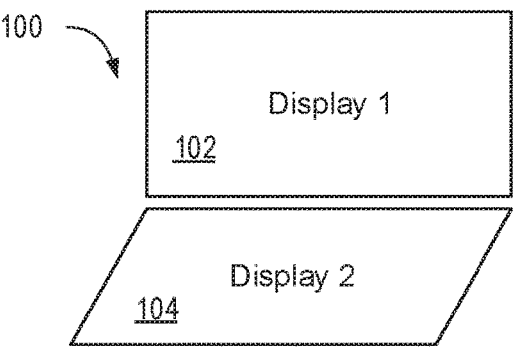
FIG. 1B illustrates an example personal computing device with a first, upper display hinged to a second, base display.

FIG. 1B illustrates an example view of a portable computing device 100 that includes a first, base electronic display 104 and a second, upper electronic display 102. The portable computing device 100 may operate in a dual display mode in which both the base electronic display 104 and upper electronic display 102 are used as display devices. Portable computing device 100 may additionally or alternatively operate in a combination input/output mode in which the base electronic display 104 is used as a touch input device to receive, for example, touch inputs and/or keystroke inputs via a virtually displayed keyboard. The term "touch inputs" as used herein may include, for example, inputs received on a touch screen surface from a user's fingers or a stylus. The term "touch input" also includes touch input signals from an active stylus, electronic pencil, electronic pen, or another similar device that conveys information associated with touch, movement, tip angle, and/or pressure. In the combination input/output mode, the upper electronic display 102 may display an operating system (OS) of the portable computing device 100.

The portable computing devices 100 and 101 illustrated in FIGS. 1A and 1B comprise an internal central processing unit CPU, an internal GPU (e.g., an iGPU or a dGPU), a communications port, and a display mode control unit, as described herein. The communications port may facilitate communication between an external computing device and the display mode control unit. The display mode control unit may selectively operate the portable computing devices 100 and 101 in each of three distinct display operational modes. The three display operational modes include a dual display operational mode, a direct input operational mode, and an indirect input operational mode, as described herein.

With reference to FIG. 1A, in the dual display operational mode, the display mode control unit may cause the GPU of the portable computing device 101 to drive the first electronic display 103 and the second electronic display 105 based on information (data) from the internal CPU of the portable computing device 101. For example, in the dual display operational mode, the first electronic display 103 and the second electronic display 105 may display an OS of the portable computing device 101 spread or extended across the width of electronic display 103 and electronic display 105.

As another example, the first electronic display 103 may display document-editing software while the second electronic display 105 displays a set of images or a video. In various examples, any of the electronic displays 102, 103, 104, and 105 in FIGS. 1A and 1B may be touchscreen electronic displays. For instance, with reference to FIG. 1B, the upper electronic display 102 may display document-editing software while the base electronic display 104 functions a touchscreen display displaying a keyboard to allow for touch inputs.

Figure 2:
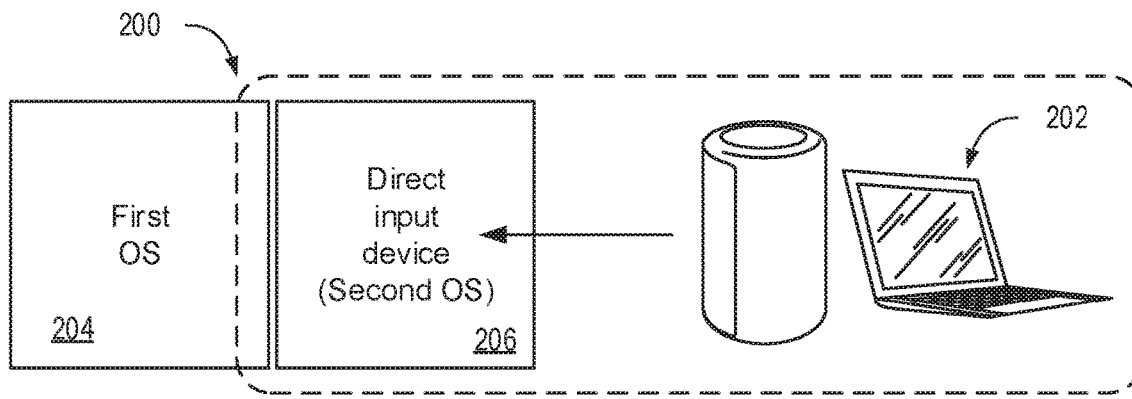
FIG. 2 illustrates an example of a dual display portable computing device connected to an external computing device in a direct input operational mode.

FIG. 2 illustrates a block diagram of the dual displays 204 and 206 of a portable computing device 200 connected to an external computing device 202 in a direct input operational mode. The portable computing device 200 is connected to the external computing device 202 via a communications port. As described herein, the portable computing device 200 may include an internal CPU, an internal GPU, a communications port, and a display mode control unit. In the direct input operational mode, the display mode control unit causes the internal GPU to display a local OS executed by the internal CPU of the portable computing device 200. The display mode control unit causes a second electronic display 206 to display information received from the external computing device 202. Specifically, the display mode control unit receives information to be displayed from the external computing device 202 via the communications port. The information to be displayed on electronic display 206 may be rendered by an external GPU associated with the external computing device 202. That is, the external GPU is external to the computing device 200 but may be internal to the external computing device 202.

In some examples, the external computing device 202 may have a GPU that is superior to the GPU of the computing device 200. In such examples, the information displayed on the second electronic display 206 may be rendered and displayed on the electronic display 206 in a manner that would not be possible if the internal GPU of the computing device 200 were used. In the illustrated example, the first electronic display 204 is displaying a first OS (e.g., Microsoft Windows™), native to the portable electronic device 200, while the second electronic display 206 is displaying a second OS (e.g., a Linux™ OS) that is being executed by a processor of the external computing device 202.

Accordingly, in the direct input operational mode, the internal GPU drives the first electronic display 204 based on data from the internal CPU. Further, in the direct input operation mode, the display mode control unit causes the second electronic display 206 to be driven based on data received from the external computing device 202 via the communications port. In some examples, the display mode control unit enables file transfers between the portable computing device 200 and the external computing device 202 by moving an icon representing a file between a graphical user interface (GUI) on the first electronic display 204 and a GUI on the second electronic display 206.

Figure 3:
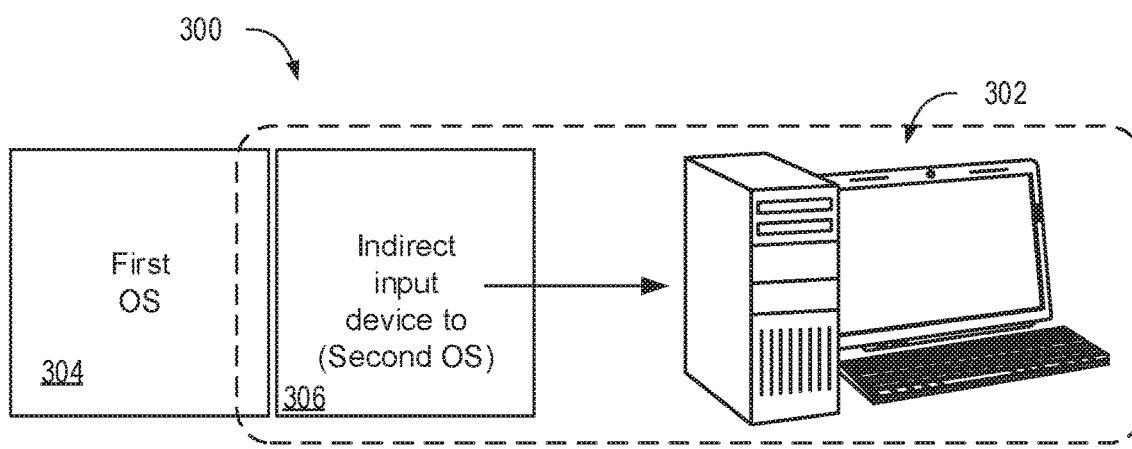
FIG. 3 illustrates an example of a dual display portable computing device connected to an external computing device in an indirect input operational mode.

FIG. 3 illustrates an example view of a portable computing device 300 with dual electronic displays 304 and 306 in an indirect input operational mode. In the illustrated example, at least electronic display 306 is a touchscreen display device. The portable computing device 300 is connected to an external computing device 302 via a communications port. In the indirect input operational mode, the portable computing device 300 functions as an input device to the external computing device 302. The display mode control unit may convey touch inputs received via the electronic touchscreen display 306 (and optionally, the first electronic display 304) to the external computing device 302 via the communications port. In various examples, the electronic touchscreen display 306 is driven by a GPU of the portable computing device 300 to avoid using the computing resources of the external computing device 302.

Figure 4A:
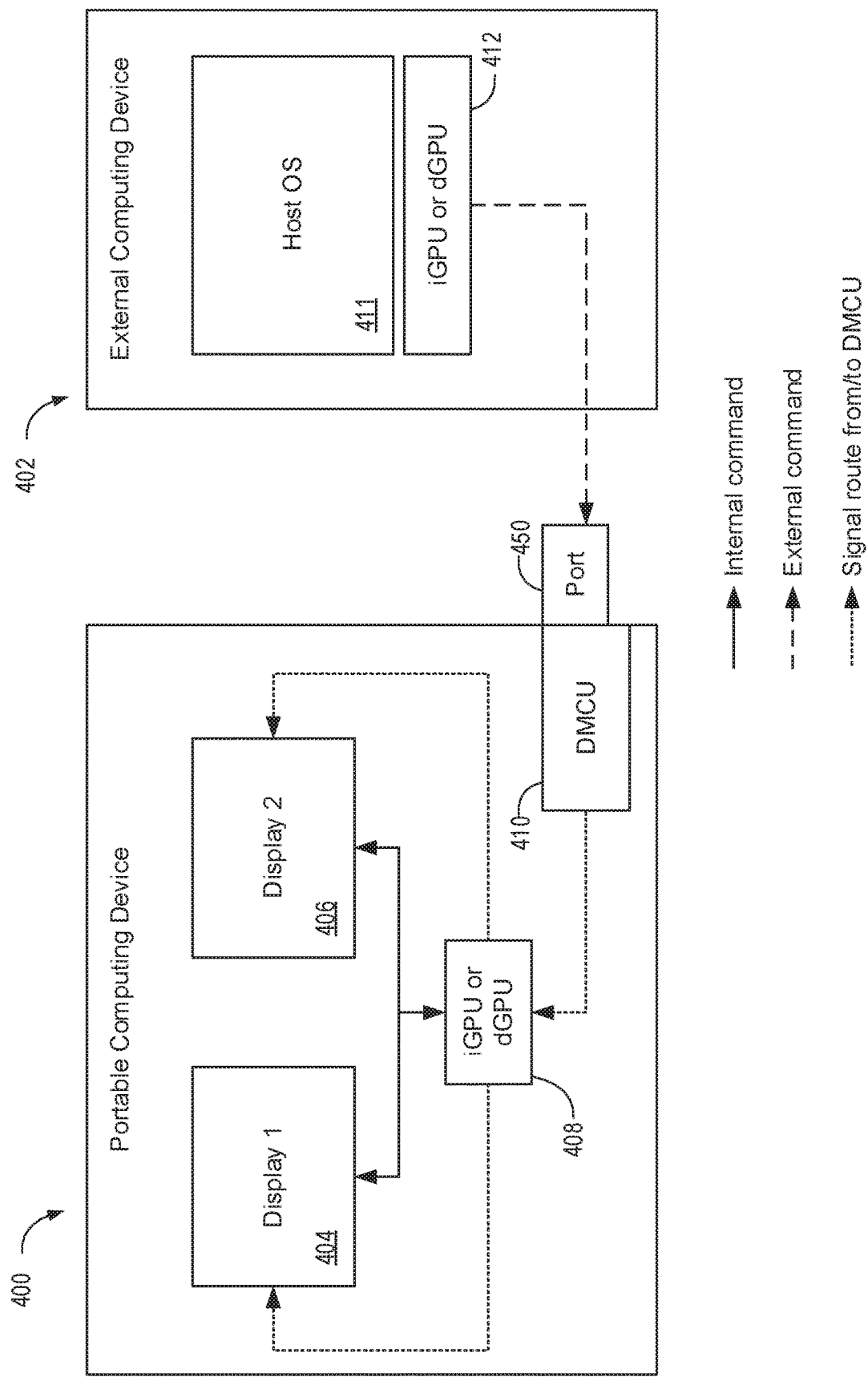
FIG. 4A illustrates a block diagram of an example portable computing device connected to an external computing device in a direct input operational mode.

FIG. 4A illustrates a block diagram of an example portable computing device 400 connected to an external computing device 402 in a direct input operational mode. As illustrated, the portable computing device 400 includes a first electronic display 404, a second electronic display 406, a GPU 408 (e.g., an iGPU or a dGPU), a CPU (not shown), and a display mode control unit 410. The display mode control unit 410 is connected to the external computing device 402 via a communications port 450. In the direct input operational mode, the external computing device 402 may send data to be displayed on the second electronic display 406 to the display mode control unit 410 via the communications port 450. As illustrated in FIG. 4A, the display mode control unit 410 may transmit the received information through the GPU 408 for display on the second electronic display 406.

In some examples, an external GPU 412 may render data from the external computing device 402 that is conveyed to the display mode control unit 410. The display mode control unit 410 may send the data rendered by the external GPU 412 for display on the second electronic display 406. The GPU 408 may receive data from the internal CPU to be displayed on the first electronic display 404. The GPU 408 may render the data from the internal CPU for display on the first electronic display 404. Accordingly, the first electronic display 404 may display a first OS executed by the portable computing device 400 while the second electronic display 406 displays a second OS (e.g., the host OS 411) executed by the external computing device 402 and rendered by the external GPU 412.

The display mode control unit 410 may facilitate file transfers between the portable computing device 400 and the external computing device 402. For example, an icon may be moved using a mouse pointer or a drag-and-drop touch input on a touch surface from the first electronic display 404 (associated with the portable computing device 400) to the second electronic display 406 (associated with the external computing device 402). The drag-and-drop gesture or another movement of the icon between the first electronic display 404 and the second electronic display 406 may cause the display mode control unit 410 to initiate a file transfer between the portable computing device 400 and the external computing device 402 via the communications port 450.

Figure 4B:
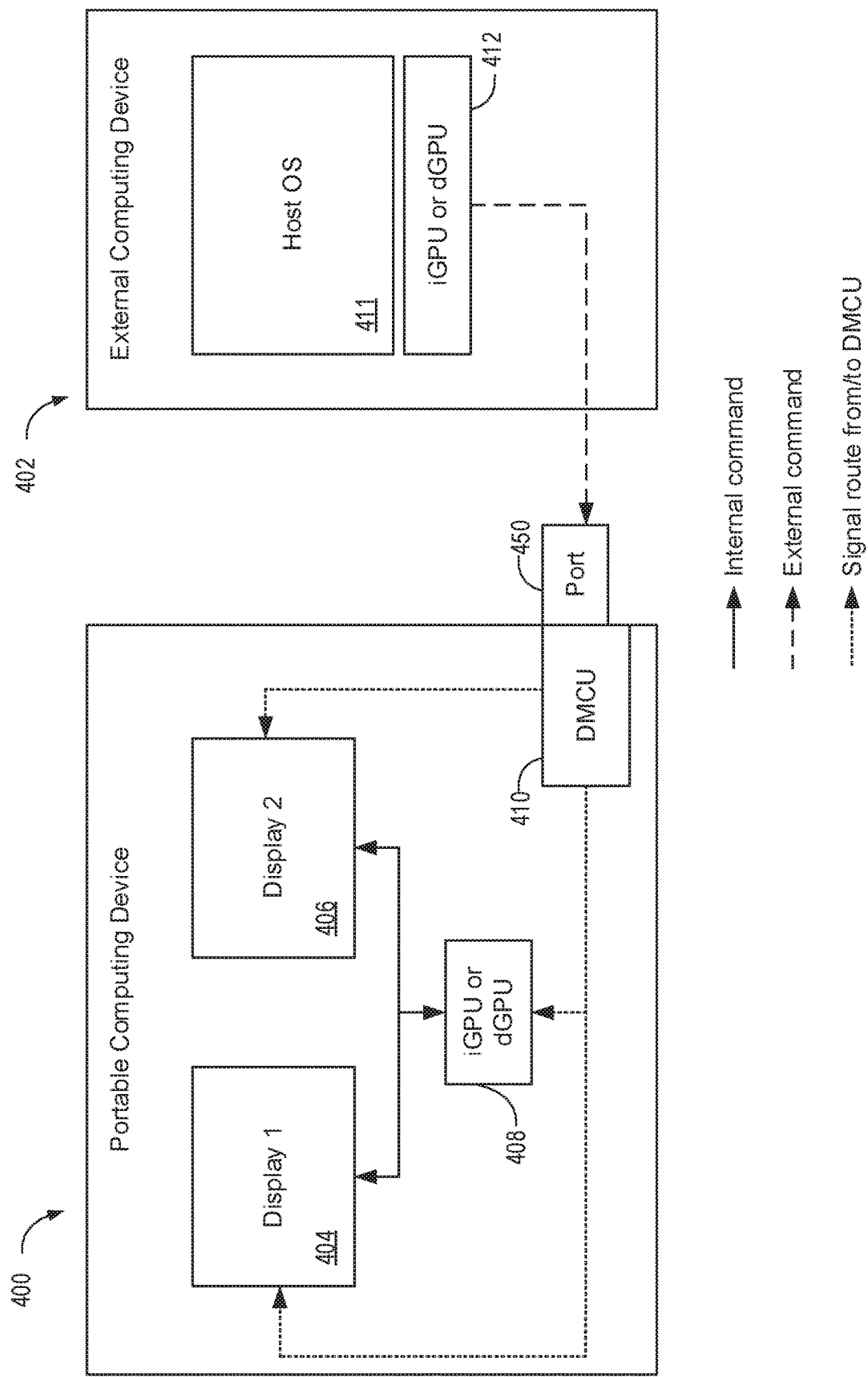
FIG. 4B illustrates the block diagram of the example portable computing device of FIG. 4A with a display mode control unit in direct communication with the dual displays.

FIG. 4B illustrates the block diagram of the example portable computing device of FIG. 4A with a display mode control unit 410 in direct communication with the two electronic displays 404 and 406. In the illustrated example, the display mode control unit 410 may instruct the GPU 408 of the portable computing device 402 to stop transmitting information for display via electronic display 406. The GPU 408 may continue to render information for display on electronic display 404, but the display mode control unit 410 will directly transmit information to be displayed on electronic display 406 that is received via communications port 450 from external computing device 402. The information to be displayed on electronic display 406 is pre-rendered by the GPU 412 of the external computing device 402. For example, electronic display 406 may display a prerendered GUI associated with the host OS 411 of the external computing device 402.

Figure 5:
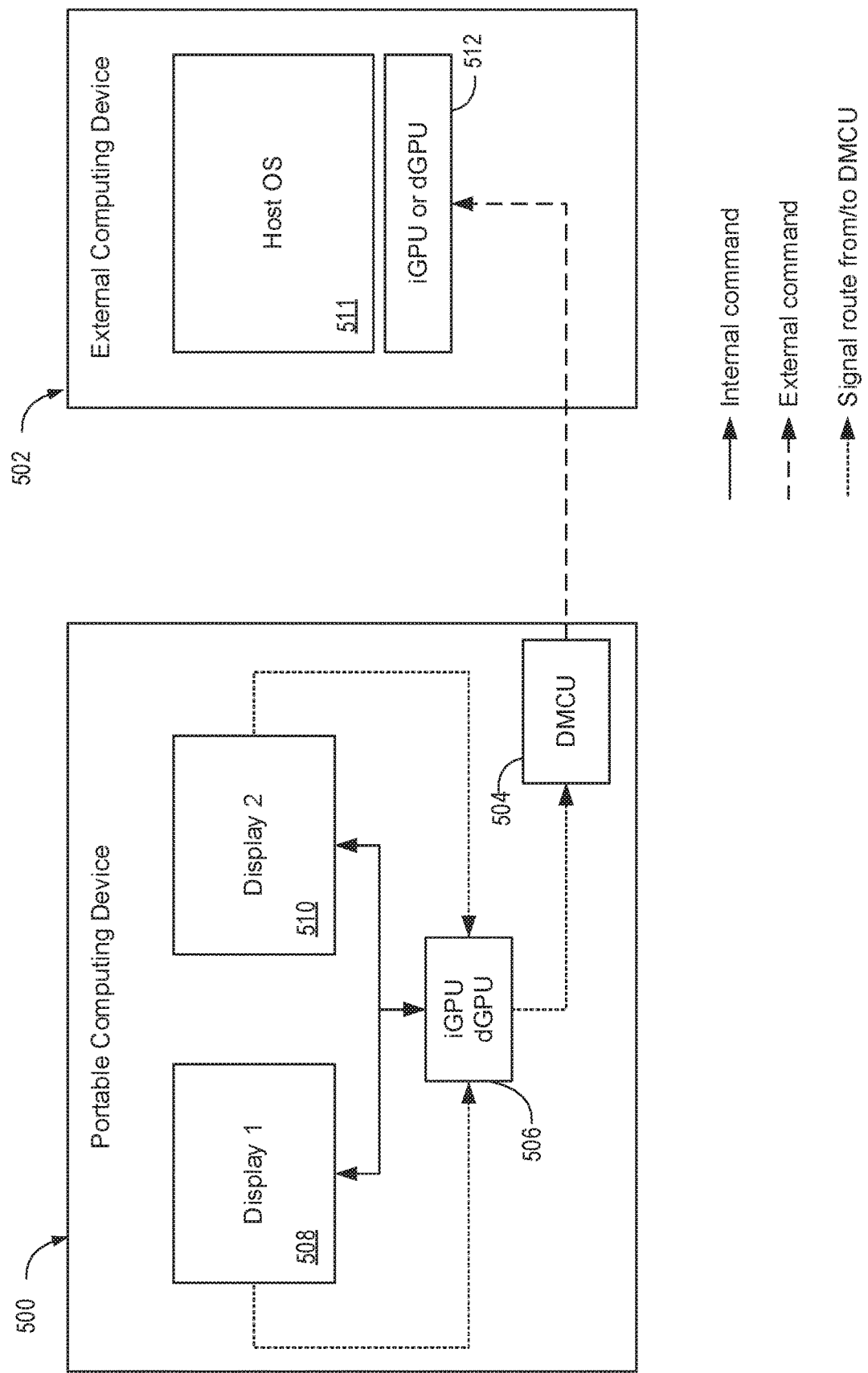
FIG. 5 illustrates a block diagram of an example portable computing device connected to an external computing device in an indirect input operational mode.

FIG. 5 illustrates a block diagram of an example portable computing device 500 connected to an external computing device 502 in an indirect input operational mode. The portable computing device 500 includes a first electronic display 508, a second electronic display 510, an internal CPU (not shown), a GPU 506 that may be integrated with the CPU or discrete and connected to the CPU, and a display mode control unit 504. The external computing device 502 may include its own GPU 512 (e.g., an integrated or discrete GPU) connected to a CPU (not shown) of the external computing device 502. The external computing device 502 may operate to execute a host OS 511.

In the indirect input operational mode, the portable computing device 500 functions as an input device to the external computing device 502. The display mode control unit 504 may convey user inputs to the external computing device 502 via a communications port represented by the dashed line identified as an "external command" in the legend of FIG. 5. The communications port may be, for example, a wired or wireless interface. The display mode control unit 504 may convey user inputs to the external computing device 502 from any of a wide variety of sources including, for example, a keyboard, a mouse, a joystick, trackpad, and the like. In some examples, electronic display 508 and/or electronic display 510 may be touchscreen electronic displays. In such examples, touch inputs provided via, for example, a user's finger and/or a stylus on the touchscreen electronic displays may be conveyed by the display mode control unit 504 to the external computing device 502.

Figure 6:
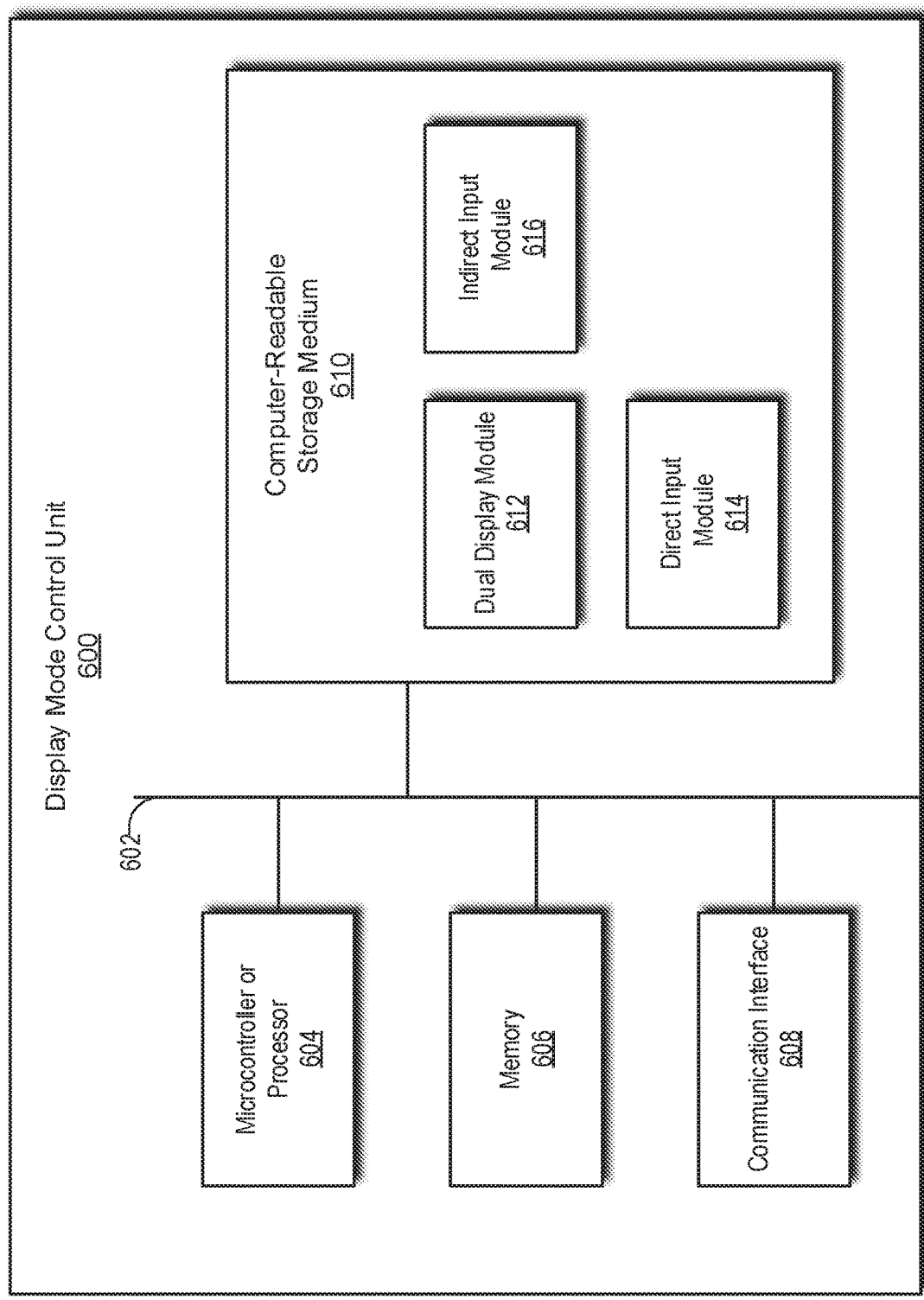
FIG. 6 illustrates an example block diagram of a portable computing device that includes a bus connected to a processor, a memory, a communications port, and a computer-readable storage medium.

FIG. 6 illustrates an example block diagram of a display mode control unit 600 that includes a bus 602 connecting a microcontroller or processor 604 (e.g., microprocessor, Field Programmable Gate Array (FPGA), etc.), a memory 606, a communication interface 608, and a computer-readable storage medium 610. The computer-readable storage medium 610 may include various modules 612-616. In the illustrated example, the modules 612-616 are implemented as instructions to be executed by the microcontroller or processor 604. However, in other examples, the modules 612-616 may be implemented as processor-executable instructions, firmware, hardware, or combinations thereof.

Display mode control unit 600 may selectively cause a portable computing device to operate in any of three distinct operational modes. In a first, dual display mode, a dual display module 612 may cause a GPU of the portable computing device to render data from the internal CPU on each of a first and second electronic display. In a second, direct input display mode, a direct input module 614 causes the GPU of the portable computing device to render data from the internal CPU for display on the first electronic display. In this second, direct input display mode, the direct input module 614 causes the second electronic display of the portable computing device to display information received from and prerendered by an external computing device. In an indirect input display mode, the display mode control unit 600 may cause the portable computing device to cease displaying any information via the first and second electronic displays. Instead, the display mode control unit 600 may cause the portable computing device to operate as an input device for the external computing device. An indirect input module 616 may operate to relay user inputs received via the portable computing device to the external computing device via the communication interface 608. In some examples, the indirect input module 616 may cause the first and/or second electronic display to display information facilitating user input into the external computing device. For example, the indirect input module 616 may cause the first electronic display to display a virtual keyboard and trackpad area while the second electronic display displays a grid pattern to facilitate freehand stylus inputs from the user.

While specific examples and applications of the disclosure have been illustrated and described, it is to be understood that the disclosure is not limited to the precise configurations and components disclosed herein. Accordingly, many changes may be made to the details of the above-described examples without departing from the underlying principles of this disclosure.

What is claimed is:

1. A portable computing device, comprising:
an internal central processing unit (CPU);
an internal graphics processing unit (GPU);
a communications port to communicate with an external computing device;
first and second electronic displays connected to the internal GPU;
a touch input device to receive touch inputs; and
a display mode control unit to selectively operate the portable computing device in three different operational modes, including:
a first, dual display operational mode in which the internal GPU drives the first and second electronic displays based on data from the internal CPU,
a second, direct input operational mode in which the internal GPU drives the first electronic display based on data from the internal CPU and the display mode control unit drives the second electronic display based on data received from the external computing device via the communications port, and
a third, indirect input operational mode in which the portable computing device functions as an input device for the external computing device with the display mode control unit conveying touch inputs received via the touch input device to the external computing device via the communications port.

2. The portable computing device of claim 1, wherein in the second, direct input operation mode, the display mode control unit enables file transfers between the portable computing device and the external computing device by moving icons representing the files between a graphical user interface (GUI) of the first electronic display driven by the internal GPU and a GUI of the second electronic display driven based on data received from the external computing device.

3. The portable computing device of claim 1, wherein in the second, direct input operational mode, the first electronic display displays a GUI of a first operating system executed by the internal CPU of the portable computing device, and the second electronic display displays a GUI of a second operating system executed by a processor of the external computing device.

4. The portable computing device of claim 1, wherein the touch input device is integrated into the first electronic display such that the first electronic display comprises a touch screen electronic display.

5. The portable computing device of claim 4, further comprising a second touch input device integrated into the second electronic display such that the second electronic display comprises a touch screen electronic display.

6. The portable computing device of claim 1, wherein the internal GPU comprises one of a discrete GPU (dGPU) and an integrated GPU (iGPU).

7. The portable computing device of claim 1, wherein in the second, direct input operational mode, the display mode control unit drives the second electronic display via internal GPU.

8. A non-transitory computer-readable medium with instructions stored thereon that, when implemented by a display mode control unit of a first computing device, cause the display mode control unit to selectively:
activate a first, dual display operational mode in which an internal graphics processing unit (GPU) of the computing device drives first and second electronic displays of the first computing device based on data from an internal processor of the first computing device;
activate a second, direct input operational mode in which the internal GPU drives the first electronic display based on data from the internal processor and the display mode control unit causes the second electronic display to be driven based on data received from a second computing device via a communications port of the first computing device; and
activate a third, indirect input operational mode in which the first computing device functions as an input device for the second computing device with the display mode control unit conveying touch inputs received via a touch input device of the first computing device to the second computing device via the communications port.

9. The non-transitory computer-readable medium of claim 8, wherein the instructions further cause the display mode control unit to:
enable, in the direct input operational mode, a file transfer between the first computing device and the second computing device by moving an icon representing the file between a GUI displayed on the first electronic display driven by the internal GPU of the first computing device and a GUI displayed on the second electronic display driven by the second computing device.

10. The non-transitory computer-readable medium of claim 8, wherein the instructions further cause the display mode control unit to:
display, via the first electronic display in the direct input operational mode, a GUI of a first operating system executed by the internal processor of the first computing device; and
display, via the second electronic display in the direct input operational mode, a GUI of a second operating system executed by a different processor of the second computing device.

11. A portable computing device, comprising:
an internal central processing unit (CPU);
an internal graphics processing unit (GPU);
a communications port to communicate with an external computing device;
a first touchscreen display connected to the internal GPU;
a second touchscreen display connected to the internal GPU; and
a display mode control unit to selectively transition the portable computing device between a direct input operational mode and an indirect input operational mode, wherein
in the direct input operational mode, the internal GPU drives the first touchscreen display to display a graphical user interface (GUI) of a first operating system executed by the internal CPU, and the display mode control unit causes the second touchscreen display to be driven based on data received via a communications port from an external computing device to display a GUI of a second operating system executed by a processor of the external computing device, and
in the indirect input operational mode, the display mode control unit conveys touch inputs received via the first and second touchscreen displays to the external computing device via the communications port.

12. The portable computing device of claim 11, wherein in the direct input operational mode, the display mode control unit facilitates a file transfer between the portable computing device and the external computing device in response to an icon representing the file being moved between the GUI displayed on the first touchscreen display and the GUI displayed on the second touchscreen display.

13. The portable computing device of claim 11, wherein in the indirect input operational mode, the display functionality of the first and second touchscreen displays is disabled.

14. The portable computing device of claim 11, wherein the internal GPU of the portable computing device comprises one of a discrete GPU (dGPU) and an integrated GPU (iGPU).

15. The portable computing device of claim 11, wherein the display mode control unit is further to selectively transition the portable computing device to a dual display mode in which the internal GPU drives the first and second touchscreen displays in an extended desktop configuration of an operating system executed by the internal CPU.

* * * * *